United States Patent Office 3,459,753

Patented Aug. 5, 1969

3,459,753

THEOPHYLLINE AND THEOBROMINE, THEIR SALTS AND PROCESSES FOR THE PRODUCTION THEREOF

Karl-Heinz Boltze, Bensberg-Kippekausen, and Dietrich Lorenz, Kleinhurden, Germany, assignors to Troponwerke Dinklage & Co., a corporation of Germany No Drawing. Filed Nov. 22, 1967, Ser. No. 686,378
Claims priority, application Germany, Nov. 25, 1966, T 32,585
Int. Cl. C07d *57/48, 57/42;* A61k *27/00*
U.S. Cl. 260—256 1 Claim

ABSTRACT OF THE DISCLOSURE

Novel theophylline and theobromine compounds and their acid addition salts having analgesic and anti-tussive activity comprising a compound of the formulae:

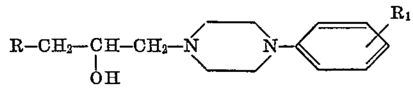

wherein R represents a radical selected from the group consisting of:

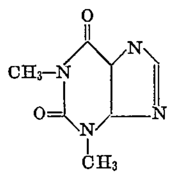

(theophylline)

and

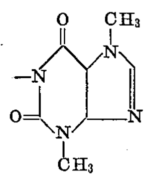

(theobromine)

and $R_1$ represents a member selected from the group consisting of hydrogen, halogen, alkyl, and methoxy.

In accordance with the invention, new theophylline and theobromine compounds, their physiologically acceptable salts and processes for the production of these compounds are claimed. The new compounds exhibit pharmacological properties, more especially analgesic and antitussive action. Therefore, the pharmaceutical preparations produced from these new compounds are also claimed.

Theophylline compounds are employed in many variations in human medicine. The main indication range for these compounds is the heart-circulation field. They improve the coronary circulation, economy of the work of the heart, peripheral circulation, increase in the blood pressure and the like. In addition, these compounds are employed as central analeptics, to intensify diuresis and to relieve vascular spasms (see Arzneimittelforsching 12, 841 (1962): 13, 470 (1963). Examples of such compounds are 7-hydroxyethyltheophylline, 7 - [1 - phenylpropyl-(2)-aminoethyl]theophylline, 7-{[1-phenyl-1 - hydroxypropyl-(2)]-aminoethyl}theophilline and 7-[3 - M-methyl-N-hydroxyethylamino) - 2 - hydroxypropyl]theophylline.

The invention relates to new theophylline and theobromine compounds of the general Formula (I)

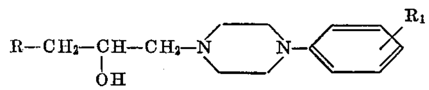

in which R represents either the theophylline radical

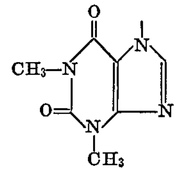

or the theobromine radical

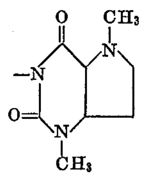

and $R_1$ represents hydrogen or one or more halogen atoms and/or one or more alkyl or alkoxy groups, the salts obtained therefrom with physiologically acceptable acids, and processes for their production. In addition, the invention relates to pharmaceutical preparations containing compounds according to the invention.

The theophylline and theobromine compounds of the general Formula (I) may be prepared by one of the following processes (a) Reaction of a compound of the general formula

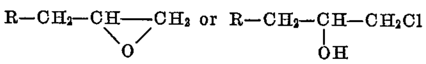

with a compound of the general formula

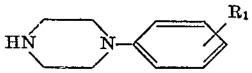

(b) Reaction of theophylline or theobromine or their sodium salts with a compound of the general formula

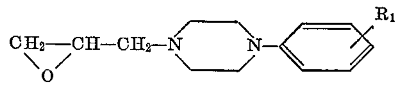

or

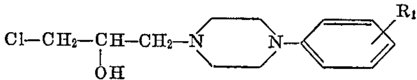

(c) Reaction of a compound of the general formula

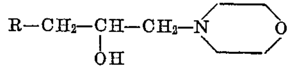

or

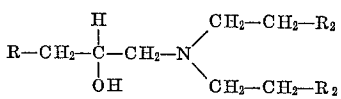

in which $R_2$ represents a halogen atom or a hydroxy group, with a compound of the general formula

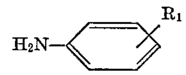

(d) Reaction of a compound of the general formula

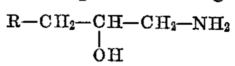

with a compound of the general formula

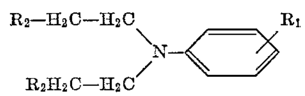

wherein $R_2$ has the above-indicated meaning.

(e) Reaction of a compound of the general formula

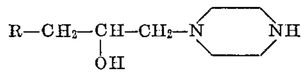

with phenyl lithium or a compound of the general formula

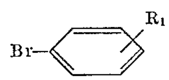

(f) Hydrogenation of a compound of the general formula

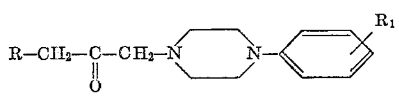

The compound (I) obtained by the above reactions may, if desired, be reacted with a physiologically acceptable acid with the formation of a salt, the radicals R and $R_1$ in all the foregoing general formulae having the meaning indicated previously.

Of the reactions specified above the embodiment is preferred is the one in which either a compound of the general formula

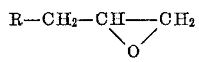

is reacted with a compound of the general formula

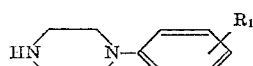

or a compound of the general formula

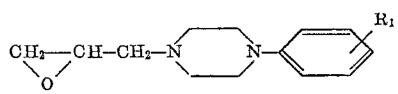

is reacted with theophylline or theobromine or sodium salts thereof.

The reactions are carried out either by condensing the two reactants by simple heating or by heating the two components in a suitable solvent. Suitable solvents include alcohols, benzene hydrocarbons and similar solvents. Preferred solvents are ethanol, benzene or toluene.

As will be apparent from the above, the products according to the invention may also be obtained by hydrogenation of compounds of the general formula:

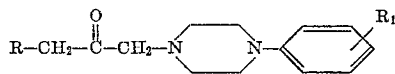

The ketone compounds mentioned above may be obtained, for example, by reacting a compound

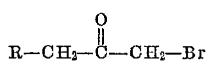

with a compound of the general formula

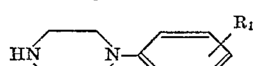

In the foregoing general formulae, the radicals R and $R_1$ have the meanings given above.

In accordance with the invention, it has surprisingly been found that in the compounds produced in accordance with the invention the previously referred to activities of the known theophylline compounds recede substantially or completely into the background in favor of a strong analgesic effect and an antitussive effect. Thus, for example, 7-{3-[4-phenylpiperazinyl-(1)]-2-hydroxypropyl} theophylline (hereinafter referred to as "P") gave in the mouse in the heating plate test an $ED_{50}$ of 12.5 mg./kg. (per os) for the analgesic effect, and 1-{-3-[phenylpiperazinyl-(1)]-2-hydroxypropyl}theobromine (hereinafter referred to as "Q") an $ED_{50}$ of 40 mg./kg., the term $ED_{50}$ in this connection being the dose at which no pain reaction is observed in 50% of the experimental animals at a plate temperature of 56° C. within 2 minutes.

In the guinea pig tooth test, P gave an $ED_{50}$ of 85 mg./kg. oral, 6.5 mg./kg. i.v., and Q gave an $ED_{50}$ of 70 mg./kg. oral, 20 mg./kg. i.v.

The $ED_{50}$ represents the dose at which an increase of the absolute threshold of at least 50% is observed on 50% of the animals with an electrical stimulus of the dental pulp.

The antitussive effect was tested on the anesthetized cat by electrical stimulation of the *N. laryngicus cran.* In this case, an $ED_{50}$ of less than 5 mg./kg. enteral and 2 mg./kg. i.v. was obtained with P, and an $ED_{50}$ of 5 mg./kg. enteral and 1 mg./kg. i.v. was obtained with Q, $ED_{50}$ in this connection being the dose at which the responsive tussal stimulus to an electrical stimulus is completely suppressed in 50% of the animals.

In addition, in the usual pharmacological tests for both compounds neither a sedative effect nor a measurable circulary or coronary effect could be observed.

The compounds according to the invention have very low toxicity. The $LD_{50}$ of P in the mouse is 630 mg./kg. oral and 220 mg./kg. i.v., and the $LD_{50}$ of Q is 710 mg./kg. oral and 300 mg./kg. i.v. (7 days observation period).

The resultant therapeutic index $LD_{50}/ED_{50}$, which, as is known, is a measure of the safety of the handling of a medicament, is consequently extremely favorable. Chronic toxicity tests carried out on dogs and cats with quantities of 50 to 300 mg./kg./per diem of active substance (rising) showed neither incompatability nor any side effects.

For the pharmaceutical preparations as an analgesic and antitussive, the active substance is employed in doses of 50 to 400 mg., preferably 100 to 250 mg., per tablet in addition to the usual adjuvants, such as agglutinants, disintegrating agents, flavouring, and the like. In addition to the solid administration forms such as tablets, sugar-coated pills and capsules, which are preferred, liquid forms of administration, for example juices and syrups, are employed.

The following examples illustrate the invention without however limiting it.

Example 1.—1-{3-[phenylpiperazinyl-(1)]-2-hydroxypropyl}theobromine 200 g. of 1-(2,3-epoxypropyl)theobromine and 130 g. of 1-phenylpiperazine are dissolved in 200 ml. of benzene and boiled under reflux for 8 hours. The 1-{3-[4-phenylpiperazinyly-(1)]-2-hydroxypropyl}theobromine which precipitates on cooling melts at 197–198° C. after recrystallization from benzene.

Yield: 81.5% of theory.

Analysis for $C_{20}H_{26}N_6O_3$: Calculated C, 6040%; H, 6.59%; N, 21.05%. Found C, 60.12%; H, 6.33%; N, 21.10%.

The monohydrochloride prepared with an equivalent quantity of ethanolic hydrochloric acid decomposes from 138° C. with evolution of gas. The dihydrochloride prepared with an excess of ethanolic hydrochloric acid decomposes from 256° C. with evolution of gas.

Analysis for $C_{20}H_{26}N_6O_3.2HCl$: Calculated C, 51.00%; H, 6.00%; N, 17.85%; Cl, 15.00%. Found C, 50.66%; H, 6.15%; N, 17.65%; Cl, 14.72%.

Example 2.—1-{3-[4-(3-chlorophenyl)piperazinyl-(1)]-2-hydroxypropyl}-theobromine.

3.58 g. of 1-(2,3-epoxypropyl) theobromine and 4 g. of 1-(3-chlorophenyl) piperazine dihydrochloride are boiled for 12 hours in absolute alcohol in the presence of twice the equivalent quantity of sodium methoxide. After sodium chloride has been filtered off, hydrogen chloride is introduced into this solution and the precipitate is filtered off and washed with ether. The 1-{3-[4-(3-chlorophenyl)-piperazinyl-(1)-]-2-hydroxypropyl}theobromine dihydrochloride monohydrate formed sinters at 215° C. and melts at 230° C.

Analysis for $C_{20}H_{25}ClN_6O_3.2HCl.H_2O$: Calculated C, 46.00%; H, 5.59%; N, 16.03%; Cl, 20.25%. Found C, 46.46%; H, 5.50%; N, 16.32%; Cl, 20.10%.

Example 3.—1-{3-[4-(4-chlorophenyl) piperazinyl-(1)]-2-hydroxypropyl}-theobromine 3.5 g. of 1-(2,3-epoxypropyl)theobromine and 4.0 g. of 1-(4-chlorophenyl)piperazine dihydrochloride are boiled for 11.5 hours in 100 ml. of absolute alcohol in the presence of two equivalents of sodium. After working up as described in Example 2, the 1-{3-[4-(4-chlorophenyl)-piperazinyl-(1)]-2-hydroxypropyl}theobromine dihydrochloride formed melts at 250° to 255° C.

Analysis for $C_{20}H_{25}ClN_6O_3.2HCl$: Calculated C, 47.50%; H, 5.39%; N, 16.61%; Cl, 21.05%. Found C, 47.32%; H, 5.64%; N, 16.68%; Cl, 20.60%.

Example 4.—1-{3-[4-(2-methoxyphenyl)piperazinyl-(1)]-2-hydroxypropyl}-theobromine 3.5 g. of 1-(2,3-epoxypropyl)theobromine and 3.9 g. of 1-(2-methoxyphenyl)piperazine dihydrochloride are boiled for 17 hours in absolute alcohol in the presence of 0.64 g. of sodium. The 1-{3-[4-(2-methoxyphenyl)-piperazinyl-(1)]-2-hydroxypropyl}theobromine dihydrochloride obtained after working up in the manner described in the foregoing melts at 230° C. with previous sintering.

Analysis for $C_{21}H_{28}N_6O_4.2HCl$: Calculated C, 50.40%; H, 6.02%; N, 16.78%; Cl, 14.12%. Found C, 50.58%; H, 6.62%; N, 17.28%; Cl, 14.57%.

Examples 5–12

The compounds listed in the following table were prepared by procedures similar to that described in the foregoing examples.

TABLE

| Example | Compound | Melting point, (° C.) |
|---|---|---|
| 5 | 1-{3-[4-(4-methoxyphenyl)piperazinyl-(1)]-2-hydroxypropyl}-theobromine dihydrochloride. | 258–260 |
| 6 | 1-{3-[4-(3-methoxyphenyl)piperazinyl-(1)]-2-hydroxypropyl}-theobromine dihydrochloride. | [1] 237 |
| 7 | 7-{3-[4-phenylpiperazinyl-(1)]-2-hydroxypropyl) monohydrochloride. | 192–194 |
| 8 | 7-{3-[4-(3-chlorophenyl)piperazinyl-(1)]-2-hydroxypropyl}-theophylline monohydrocloride hydrate. | 254–256 |
| 9 | 7-{3-[4-(4-chlorophenyl)piperazinyl-(1)]-2-hydroxypropyl}-theophylline dihydrochloride. | 215–219 |
| 10 | 7-{3-[4-(2-methoxyphenyl)piperazinyl-(1)]-2-hydroxypropyl}-theophylline dihydrochloride. | 242–246 |
| 11 | 7-{3-[4-(3-methoxyphenyl)piperazinyl-(1)]-2-hydroxypropyl}-theophylline dihydrochloride. | 230–232 |
| 12 | 7-{3-[4-(4-methoxyphenyl)piperazinyl-(1)]-2-hydroxypropyl}-theophylline dihydrochloride. | 256–257 |

[1] After sintering at 230° C.

Example 13.—1-{3-[phenylpiperazinyl-(1)]-2-hydroxypropyl}theobromine 14.5 g. of theobromine and 16.5 g. of 1-(2,3-epoxypropyl)-4-phenylpiperazine are dissolved in about 80 ml. of benzene and boiled under reflux for 6 hours. The crystals precipitating on cooling are recrystallized from benzene. The 1-{3-[4-phenylpiperazinyl-(1)]-2-hydroxypropyl}theobromine obtained melts at 197–198° C. The yield is 23.8 g., corresponding to 78% of theory.

What we claim is:

1. A compound selected from the group consisting of (a) compounds of the formula:

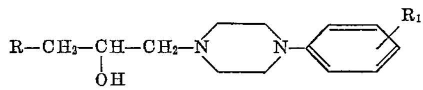

wherein R represents a radical selected from the group consisting of

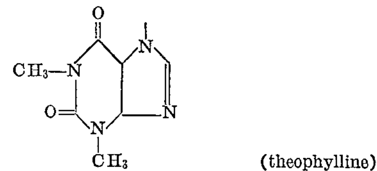

(theophylline)

and

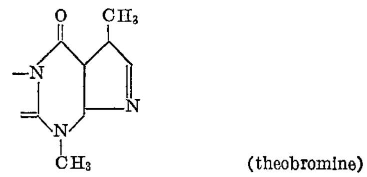

(theobromine)

and $R_1$ represents a member selected from the group consisting of hydrogen, chlorine and methoxy, and (b) the physiologically acceptable acid addition salts thereof.

References Cited

UNITED STATES PATENTS 2,924,598 2/1960 Bestian ............ 260—256

ALEX MAZEL, Primary Examiner

ANNE MARIE TIGHE, Assistant Examiner

U.S. Cl. X.R.

424—253

PO-1050
(5/69)

UNITED STATES PATENT OFFICE
CERTIFICATE OF CORRECTION

Patent No. 3,459,753 Dated August 5, 1969

Inventor(s) Karl-Heinz Boltze et al.

It is certified that error appears in the above-identified patent and that said Letters Patent are hereby corrected as shown below:

Column 1, lines 25 to 33, the formula should appear as shown below:

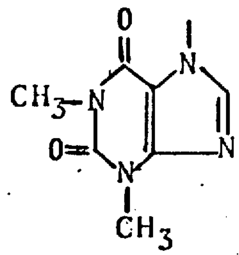

Column 1, lines 37 to 43, the formula should appear as shown below:

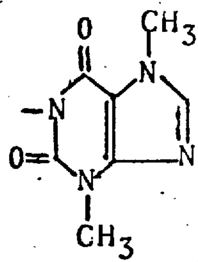

Column 2, lines 17 to 23, the formula should appear as shown below:

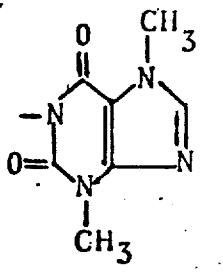

PO-1050
(5/69)

UNITED STATES PATENT OFFICE
CERTIFICATE OF CORRECTION

Patent No. 3,459,753 Dated August 5, 1969

Inventor(s) Karl-Heinz Boltze et al.

It is certified that error appears in the above-identified patent and that said Letters Patent are hereby corrected as shown below:

Column 4, line 48, "1- 3-[phenylpiperazinyl-(1)]-2-hydroxy should read -- 1- 3-[4-phenylpiperazinyl-(1)]-2-hydroxy- --

Column 4, line 54, "piperazinyly" should read -- piperazin

Column 6, lines 26 to 33, the formula should appear as sho below:

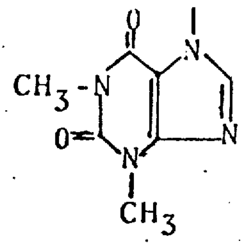

Column 6, lines 38 to 45, the formula should appear as sho below:

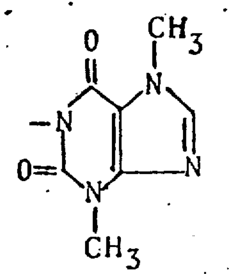

SIGNED AND SEALED
AUG 25 1970

(SEAL)
Attest:

Edward M. Fletcher, Jr.
Attesting Officer

WILLIAM E. SCHUYLER, JR.
Commissioner of Patents